United States Patent
Lee et al.

(10) Patent No.: US 11,824,171 B2
(45) Date of Patent: Nov. 21, 2023

(54) INTERNAL PRESSURE MEASURING JIG FOR CYLINDRICAL BATTERY CELL

(71) Applicant: LG CHEM, LTD., Seoul (KR)

(72) Inventors: Myung An Lee, Daejeon (KR); Joo Hwan Sung, Daejeon (KR); Jung Hoon Kim, Daejeon (KR); Byung Hyuk Choi, Daejeon (KR); Ik Jong Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 545 days.

(21) Appl. No.: 17/056,681

(22) PCT Filed: Nov. 27, 2019

(86) PCT No.: PCT/KR2019/016462
§ 371 (c)(1),
(2) Date: Nov. 18, 2020

(87) PCT Pub. No.: WO2020/116851
PCT Pub. Date: Jun. 11, 2020

(65) Prior Publication Data
US 2021/0226265 A1     Jul. 22, 2021

(30) Foreign Application Priority Data

Dec. 3, 2018   (KR) ........................ 10-2018-0153835

(51) Int. Cl.
*H01M 10/42*       (2006.01)
*H01M 10/04*       (2006.01)
(Continued)

(52) U.S. Cl.
CPC ... *H01M 10/4285* (2013.01); *H01M 10/0422* (2013.01); *H01M 10/486* (2013.01); *G01K 7/02* (2013.01)

(58) Field of Classification Search
CPC ......... H01M 10/4285; H01M 10/0422; H01M 10/486; H01M 10/42; H01M 10/52; H01M 50/30
See application file for complete search history.

(56) References Cited

U.S. PATENT DOCUMENTS

2001/0038940 A1* 11/2001 Okumura ............ H01M 50/574
429/185
2009/0258297 A1* 10/2009 Davis ...................... H01M 4/50
429/224

(Continued)

FOREIGN PATENT DOCUMENTS

CN        2290050 Y     9/1998
CN      101281984 A    10/2008
(Continued)

OTHER PUBLICATIONS

Extended European Search Report dated May 27, 2021 issued by the European Patent Office in corresponding European patent application No. 19893591.8.

(Continued)

*Primary Examiner* — Imran Akram
(74) *Attorney, Agent, or Firm* — Morgan, Lewis & Bockius LLP (57) ABSTRACT

An internal pressure measuring jig for a cylindrical battery cell, of the present invention, comprises: a lower jig which has a form corresponding to a cylindrical battery cell, and has a temperature measuring part and a receiving groove in which the cylindrical battery cell is separably inserted; and an upper jig which discharges gas inside the cylindrical battery cell, has a pressure measuring part for measuring the pressure of the discharged gas, and is separably coupled to the lower jig so as to close off an opening part of the receiving groove.

14 Claims, 7 Drawing Sheets

(51) Int. Cl.
*H01M 10/48* (2006.01)
*G01K 7/02* (2021.01)

(56) References Cited

U.S. PATENT DOCUMENTS

| | | | |
|---|---|---|---|
| 2010/0112420 A1 | 5/2010 | Back | |
| 2011/0232302 A1* | 9/2011 | Dallinger | H01M 10/4285 62/3.7 |
| 2012/0133521 A1* | 5/2012 | Rothkopf | G01R 31/50 340/636.1 |
| 2014/0191763 A1* | 7/2014 | Hu | H01M 10/4285 324/426 |
| 2014/0241394 A1 | 8/2014 | Olson | |
| 2014/0312911 A1* | 10/2014 | Ding | H01M 10/486 324/426 |
| 2015/0054518 A1* | 2/2015 | Henrici | G01R 31/382 324/426 |
| 2016/0064972 A1* | 3/2016 | Stefanopoulou | H02J 7/0013 324/426 |
| 2017/0165513 A1* | 6/2017 | Li | H01M 10/486 |
| 2018/0009328 A1* | 1/2018 | Hinterberger | H02J 7/04 |
| 2018/0040926 A1* | 2/2018 | Keser | H01M 10/0436 |
| 2018/0226698 A1* | 8/2018 | Lin | H01M 10/0525 |
| 2018/0287224 A1* | 10/2018 | Ryoo | G01N 29/2468 |
| 2019/0260036 A1* | 8/2019 | Sliger | H01B 1/02 |
| 2019/0334146 A1* | 10/2019 | Lai | A62C 31/00 |
| 2020/0035082 A1* | 1/2020 | Lee | G08B 5/22 |

FOREIGN PATENT DOCUMENTS

| | | |
|---|---|---|
| CN | 101294827 A | 10/2008 |
| CN | 101726388 A | 6/2010 |
| CN | 102868003 A | 1/2013 |
| CN | 206194914 U | 5/2017 |
| JP | 05-036442 A | 2/1993 |
| JP | 2001-332312 A | 11/2001 |
| JP | 2002-289265 A | 10/2002 |
| JP | 2002-313437 A | 10/2002 |
| JP | 2010-102928 A | 5/2010 |
| JP | 2013-205044 A | 10/2013 |
| JP | 2016-051683 A | 4/2016 |
| JP | 2016-122505 A | 7/2016 |
| KR | 10-2008-0023375 A | 3/2008 |
| KR | 10-2010-0088927 A | 8/2010 |
| KR | 10-2013-0063207 A | 6/2013 |
| KR | 10-2015-0124493 A | 11/2015 |
| KR | 10-2016-0081394 A | 7/2016 |
| KR | 10-2017-0042082 A | 4/2017 |
| KR | 10-2017-0083214 A | 7/2017 |
| KR | 10-2018-0100748 A | 9/2018 |
| KR | 10-2018-0113212 A | 10/2018 |

OTHER PUBLICATIONS

International Search Report (with partial translation) and Written Opinion issued in corresponding International Patent Application No. PCT/KR2019/016462, dated Mar. 5, 2020.

Office Action dated Aug. 22, 2023 issued by the Chinese Patent Office in corresponding Chinese patent application No. 201980031751.0.

* cited by examiner

INTERNAL PRESSURE MEASURING JIG FOR CYLINDRICAL BATTERY CELL

TECHNICAL FIELD

This application claims the benefit of priority based on Korean Patent Application No. 10-2018-0153835, filed on Dec. 3, 2018, and the entire contents of the Korean patent application are incorporated herein by reference.

The present invention relates to a jig for measuring internal pressure of a cylindrical battery cell, and more particularly, to a jig for measuring internal pressure of a cylindrical battery cell capable of correcting the result of the internal pressure measurement according to temperature, in which a pressure sensor and a gas discharge induction unit are located in the same space.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an electrode mixture containing an electrode active material to a surface of a current collector, then a separate is interposed therebetween to thereby make an electrode assembly, which is then mounted in a cylindrical or rectangular metal can or inside a pouch-type case of an aluminum laminate sheet, and a liquid electrolyte in injected or impregnated into the electrode assembly or a solid electrolyte to prepare a secondary battery.

One of the main research tasks of the secondary battery as described above is to improve the safety of the secondary battery. The secondary battery has a number of problems that threaten the safety of the secondary battery, such as internal short circuit due to external shock, overcharge, heat generation by over-discharge, etc., and decomposition of electrolytes due thereto, thermal runaway, etc.

In particular, the explosion of the secondary battery originates from various causes, but an increase in gas pressure inside the secondary battery also becomes a cause according to the decomposition of the electrolyte. Specifically, when the secondary battery is repeatedly charged and discharged, gas is generated through an electrochemical reaction by the electrolyte and the electrode active material. At this time, the generated gas increases the internal pressure of the secondary battery, causing weakening of fastening between parts, damage to the external battery case of the secondary battery, premature operation of the protection circuit, deformation of the electrode, internal short circuit, and explosion, etc.

In order to solve the safety problem of the secondary battery as described above, it was necessary to check the occurrence of a problem through a device for measuring the internal pressure during charging and discharging of the secondary battery.

The conventional pressure measuring device of a battery cell has used a method in which a cell is drilled in a battery cell and a gas is diffused into a space inside the device to perform measurement. In this regard, Korean Patent Publication No. 10-2010-0088927 discloses a method of measuring the internal pressure of a secondary battery by drilling a hole in the external battery case of the secondary battery for pressure measurement and attaching a pressure sensor. However, the above technology has great limitations in accurate pressure measurement because gas leakage, electrolyte leakage, and changes in the internal space due to the installation of a pressure sensor may be caused in the process of drilling a hole for pressure measurement.

In addition, since the space inside the conventional pressure-resistant measuring device is wider than the space inside the cell to be mounted, there is a problem in that gas discharged from the battery cell is located in an unnecessarily wide space. For this reason, it was necessary to minimize the gas flow space in the device when gas is discharged from the battery cell.

In addition, since the pressure measuring unit and the gas discharge unit are conventionally separated, not only the error value is large, but also the measured pressure value has an error due to the temperature change. As such, in the process of correcting the pressure result value according to the temperature, it was difficult to perform precise internal pressure measurement as the error increased.

DISCLOSURE

Technical Problem

The present invention was designed to solve the above problems, and an object of the present invention is to provide a jig for measuring internal pressure capable of accurately checking the internal pressure result of a cylindrical battery cell by allowing correction of internal pressure according to temperature change by locating the gas discharge unit and the pressure measuring unit in the same space for measurement of internal pressure of the cylindrical battery cell, and installing the temperature sensor in contact with the loaded cylindrical battery cell.

In addition, an object of the present invention is to provide an internal pressure measuring jig that enables precise internal pressure measurement by minimizing a gas discharge space by fastening an upper jig and a lower jig.

Technical Solution

According to an embodiment of the present invention, there is provided A jig for measuring internal pressure of a cylindrical battery cell, including: a lower jig configured to have a shape corresponding to that of the cylindrical battery cell, and include a receiving groove, into which the cylindrical battery cell is detachably fitted, and a temperature measuring unit; and an upper jig configured to include a pressure measuring unit that discharges gas inside the cylindrical battery cell and measures a pressure of the discharged gas, and be detachably coupled with the lower jig to close an opening of the receiving groove.

The temperature measuring unit may include a temperature sensor extending into the receiving groove to measure the temperature of the cylindrical battery cell, and the lower jig may further include a temperature sensor hole through which the temperature sensor passes. In this case, the temperature sensor hole may be sealed by applying a sealing material in a state that the temperature sensor is penetrated, and the temperature sensor may be a thermocouple in which stainless (SUS) wire is covered by an insulating member.

The pressure measuring unit may include: a gas discharge induction unit for forming a hole in the cylindrical battery cell to discharge gas inside the cylindrical battery cell; and a pressure sensor for measuring a pressure of the gas discharged by operation of the gas discharge induction unit. Herein, the upper jig may further includes a pressure sensor hole through which the pressure sensor passes, and the pressure sensor hole may be sealed by applying a sealing material in a state that the pressure sensor is penetrated.

Herein, the gas discharge induction unit may include a support unit having a sharp shape on one surface and forming a hole in the cylindrical battery cell, and a gas discharge operation switch connected to the support unit and moving the support unit in a direction of the cylindrical battery cell, and the support unit may have a needle or cone shape. Further, the gas discharge operation switch may include a spring therein for a push/pull scheme.

According to another embodiment of the present invention, the upper jig may be provided with a sealing member for sealing a space between the receiving groove and the upper jig. Specifically, the upper jig may further include a sealing groove formed along a circumference of the receiving groove, and the sealing member may be formed by applying a sealing material on the sealing groove to be in pressure contact with the lower jig when the upper jig closes an opening of the receiving groove.

According to another embodiment of the present invention, the jig may further include a coupling member configured to closely couple the upper jig to the lower jig. Specifically, the lower jig may further include at least one lower coupling hole, the upper jig may further include at least one upper coupling hole corresponding to the lower coupling hole, and the coupling member may be provided with a coupling bolt screwed to the lower coupling hole and the upper coupling hole.

According to another embodiment of the present invention, the jig for measuring internal pressure of the cylindrical battery cell of the present invention may further include a display unit for displaying a temperature and a pressure measured by the temperature measuring unit and the pressure measuring unit.

Advantageous Effects

According to the present invention, when measuring the internal pressure for setting the open pressure of a current interruptive device (CID) at the time of designing a cylindrical battery cell, by positioning the gas discharge unit and the pressure measuring unit inside the jig for measuring the internal pressure in the same space, the discharged gas is discharged to the pressure measuring unit and the gas flow space is minimized, thereby reducing the error in pressure measurement, thereby enabling precise measurement.

In addition, in order to correct the pressure according to the temperature change due to gas discharge, the temperature measuring unit was designed to penetrate the lower jig in the present invention. As such, as one side of the temperature measuring unit comes into contact with the cylindrical battery cell to be mounted and the other side is exposed outside the jig, it is possible to measure and monitor the temperature of the cylindrical battery cell from the outside, and to minimize the occurrence of errors during pressure correction according to real-time monitoring.

DETAILED DESCRIPTION OF THE PREFERRED EMBODIMENTS

Hereinafter, preferred embodiments of the present invention will be described in detail with reference to the accompanying drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In general, in secondary batteries, swelling occurs under abnormal conditions such as overcharge, overdischarge, short circuit, and overcurrent. In this case, the degree of swelling cannot be accurately detected in real time. The swelling phenomenon of the secondary battery refers to a phenomenon in which the internal pressure of the battery cell increases rapidly and the external side, case, etc. of the battery swell. This swelling phenomenon is due to a phenomenon in which gas is generated by heat generation or ignition of the electrode of the secondary battery, or gas is generated by decomposition of the electrolyte by overvoltage.

When gas is generated in the battery as described above, an explosion of the secondary battery may be caused, and such an explosion may not only destroy the pack of the secondary battery or devices including the same, but also injure the user.

In addition, damage to the battery case due to explosion of the secondary battery may cause leakage of the electrolyte provided in the secondary battery, and may cause damage such as short circuit, electric shock, or fire.

Accordingly, an object of the present invention is to provide a precise jig for measuring the internal pressure when designing a cylindrical battery cell to prevent such problems. In the jig for measuring internal pressure according to the present invention, the pressure sensor and the gas discharge induction unit are placed in the same space, it is possible to minimize the gas flow space compared to the conventional one as being equipped with the temperature measuring unit, and it is possible to correct the pressure measurement value according to real-time temperature monitoring, thereby exhibiting the effects of allowing precise internal pressure measurement.

Hereinafter, a jig for measuring internal pressure of the present invention will be described.

Figure 1:
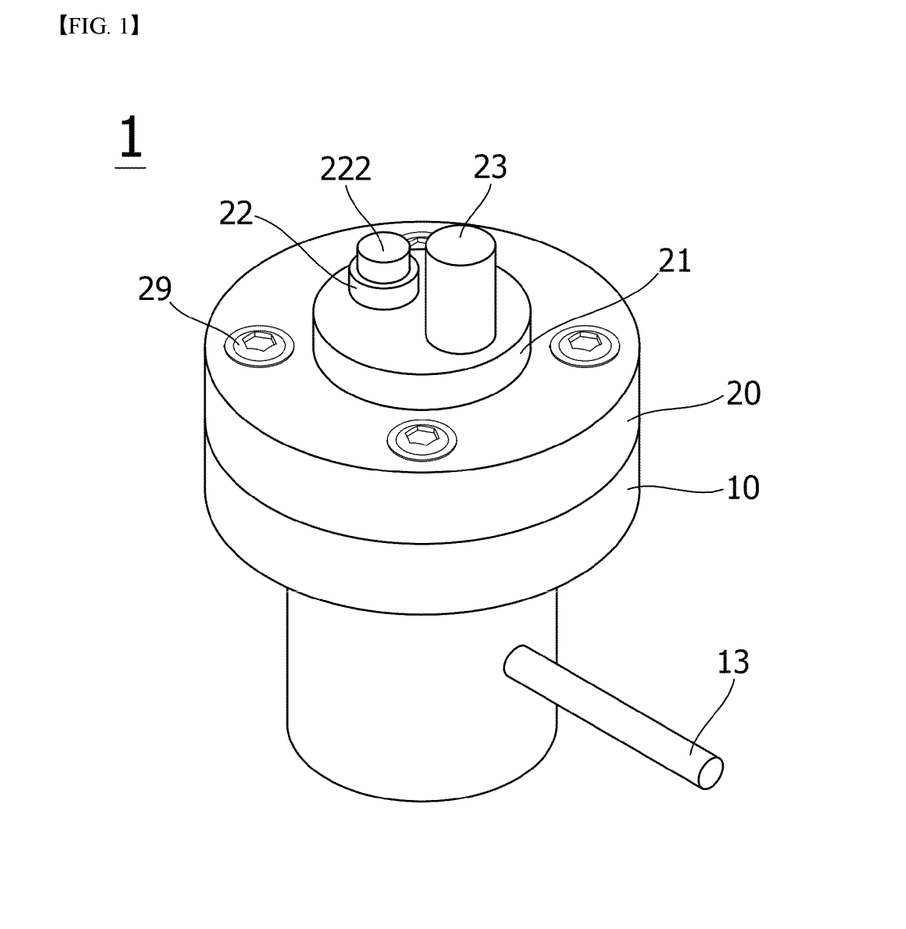
FIG. 1 is a combined schematic view showing a jig for measuring internal pressure of a cylindrical battery cell of the present invention.
Figure 2:
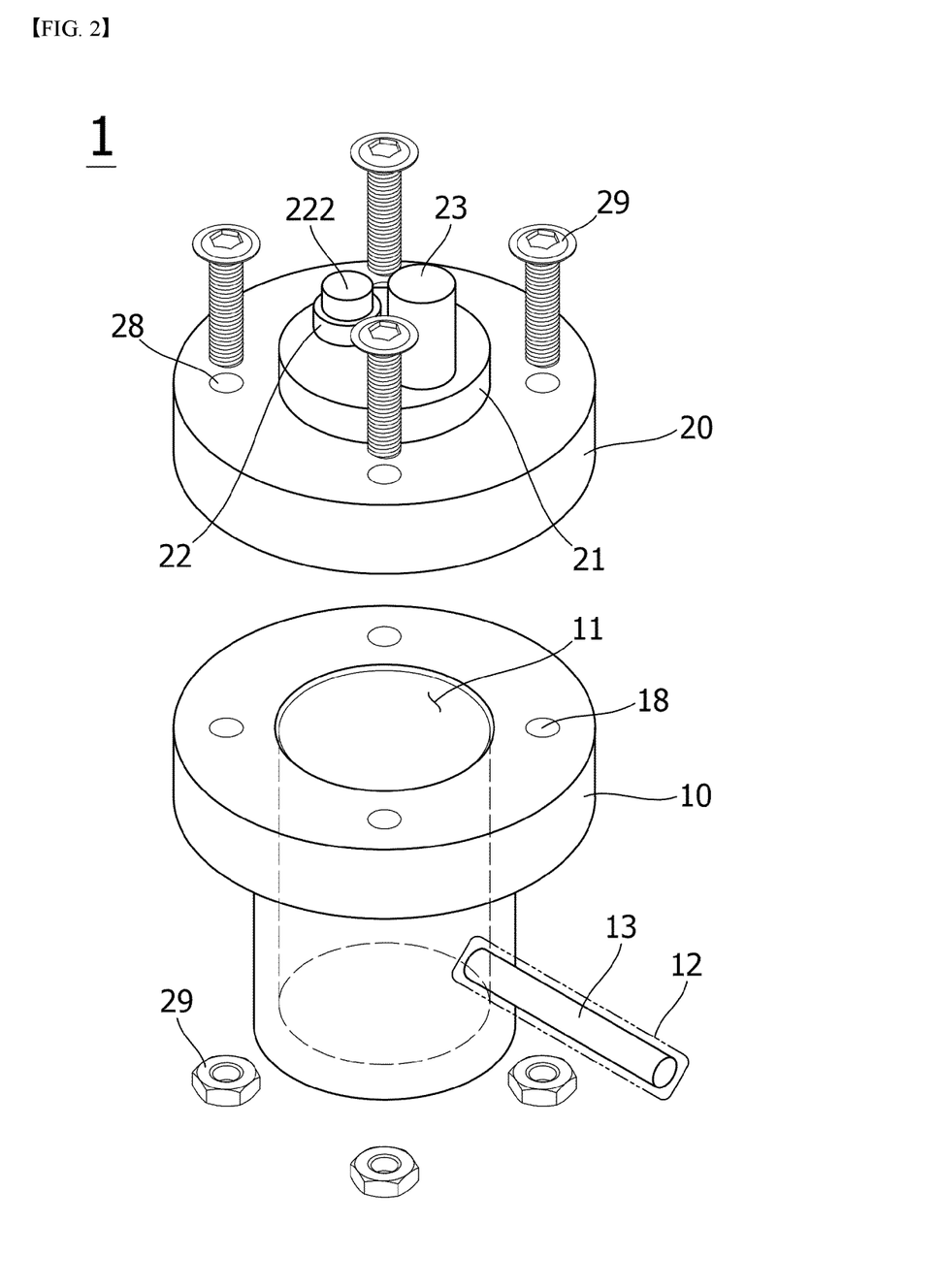
FIG. 2 is a separated schematic view showing a jig for measuring internal pressure of a cylindrical battery cell of the present invention.

FIG. 1 is a schematic diagram showing a combined state of a jig for measuring internal pressure of a battery cell according to an embodiment of the present invention, and FIG. 2 is a schematic diagram showing a separated state of a jig for measuring internal pressure of the present invention.

Referring to FIGS. 1 and 2, a jig 1 for measuring internal pressure of a cylindrical battery cell according to an aspect of the present invention includes: a lower jig 10 configured to have a shape corresponding to that of the cylindrical battery cell, and include a receiving groove 11, into which the cylindrical battery cell is detachably fitted, and a temperature measuring unit 12; and an upper jig 20 configured to include a pressure measuring unit 21 that discharges gas inside the cylindrical battery cell and measures a pressure of the discharged gas, and be detachably coupled with the lower jig 10 to close an opening of the receiving groove 11.

The pressure measuring unit 21 of the upper jig 20 includes a gas discharge induction unit 22 and a pressure sensor 23 including a gas discharge operation switch 222. In addition, as shown in FIG. 1, the lower jig 10 and the upper jig 20 are sealed and fastened to each other. The above sealing fastening structure of the lower jig 10 and the upper jig 20 is used not to deviate from the originally loaded position or state or to deviate significantly in order to accurately measure the internal pressure of the cylindrical battery cell.

In the present invention, the cylindrical battery cell whose internal pressure is measured is loaded into the receiving groove 11 of the lower jig 10. At this time, the loading direction of the cylindrical battery cell loads the battery cell such that the bottom surface of the battery cell faces upward. This is because the thickness of the cylindrical battery cell is too thick to penetrate the upper cap. That is, by loading such that the bottom of the battery cell becomes the upper part, a hole is well formed in the bottom of the battery cell through the pressure measuring unit of the jig of the present invention described later, so that the gas inside the battery cell can be easily discharged.

FIG. 2 is a separated schematic view showing a jig for measuring internal pressure of the present invention. The lower coupling hole 18 formed at the edge of the lower jig 10 and the upper coupling hole 28 formed at the edge of the upper jig 20 are formed at positions corresponding to each other. The lower coupling hole 18 and the upper coupling hole 28 provide an installation space of the coupling bolt of the coupling member 29 to be described later. A plurality of upper coupling holes 28 are formed at predetermined intervals along the edge of the upper jig 20 so as to correspond to the lower coupling holes 18, respectively. At the same time, a plurality of lower coupling holes 18 are also formed at predetermined intervals along the edge of the lower jig 10 so as to correspond to the upper coupling holes 28, respectively.

The coupling member 29 is a member for closely coupling the lower jig 10 and the upper jig 20 so that the receiving groove 11 is closed. As shown in FIG. 2, the coupling member 29 includes a plurality of coupling bolts screwed with the lower coupling hole 18 and the upper coupling hole 28, and a nut which is screwed with the coupling bolt to allow the lower jig 10 to be in close contact with the upper jig 20.

The head of the coupling bolt is supported on the upper surface of the upper jig 20, and the end portion of the coupling bolt is screwed to the upper coupling hole 28 and the lower coupling hole 18 to penetrate the lower jig 10. Correspondingly, the nut is screwed into the end portion of the coupling bolt passing through the lower coupling hole 18. Then, the lower jig 10 and the upper jig 20 are tightened by the bolt head and the nut to be tightly coupled.

Figure 3:
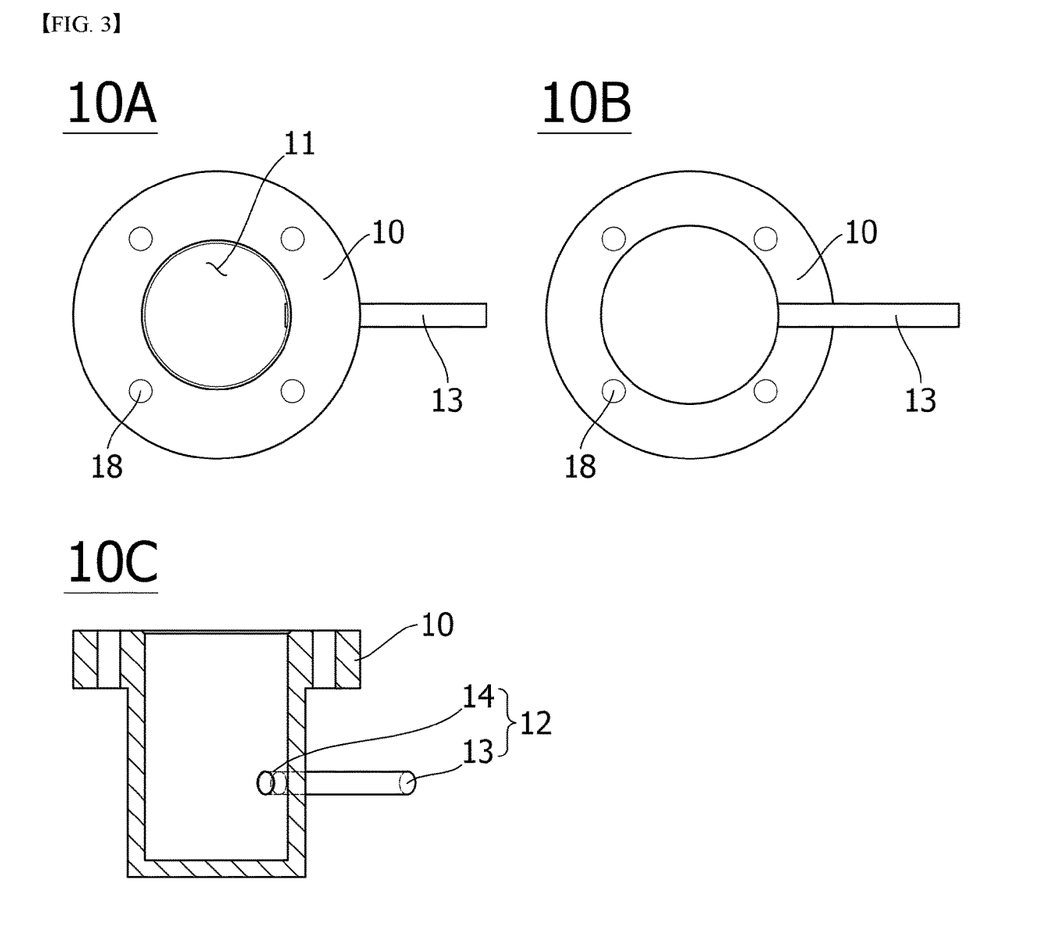
FIG. 3 is a top/bottom/side sectional view of a lower jig of the present invention.

FIG. 3 is a schematic view showing the lower jig 10 of a jig for measuring internal pressure, in which 10A is a plan view of the lower jig 10 facing the upper jig 20, 10B is a plan view of the lower jig 10 exposed in the outer direction, and 10C is a side view of the lower jig 10.

First, referring to 10A, the receiving groove 11 is a space in which a cylindrical battery cell for measuring pressure is received by discharging internal gas. The inner portion is preferably formed of a metal material, but is not limited thereto. In addition, it has a shape corresponding to the cylindrical battery cell so that the cylindrical battery cell can be fitted for separation and loading. As in the present invention, since the receiving groove 11 has a shape corresponding to that of the cylindrical battery cell, when internal gas is generated inside the cylindrical battery cell, the internal gas is discharged into the receiving groove of the lower jig and the gas flow space can be minimized. Minimizing the flow space of the gas exerts an effect of increasing the precision of pressure measurement according to gas discharge.

In addition, the lower jig 10 is characterized in that it has a temperature measuring unit 12 on the side. The temperature measuring unit 12 is provided on one side of the lower jig 10, as shown in 10A and 10B. Although one temperature measuring unit 12 is provided in the present application, two or more may be provided for precise temperature measurement.

Specifically, the temperature measuring unit 12 includes a temperature sensor 13 extending into the receiving groove 11 to measure the temperature of the cylindrical cell, and a temperature sensor hole 14 through which the temperature sensor 13 passes.

First, the temperature sensor 13 is characterized in that a stainless (SUS) wire is a thermocouple covered with an insulating member. The temperature of the cylindrical battery cell is measured through the temperature sensor 13, and the temperature change outside the jig can be monitored in real time. In the present invention, by using a stainless steel wire as the temperature sensor 13, it is strong even in corrosion and high temperature, robust against external shocks and vibrations, and is rapid and precise in reaction.

In addition, the temperature sensor 13 has a structure penetrating the lower jig 10. One side of the temperature sensor 13 is in contact with the receiving groove 11, and the other side is exposed to the outside of the jig.

The temperature sensor hole 14 is a hole formed on the lower jig 10 through which the temperature sensor 13 penetrates, as shown in 10C, and is formed to correspond to the diameter of the temperature sensor 13. That is, it has a structure capable of measuring temperature by making contact with a cylindrical battery cell into which the temperature sensor 13 is loaded through the temperature sensor hole 14 generated on one side of the lower jig 10.

Here, it is characterized in that a sealing material is applied and sealed along the outer periphery of the temperature sensor hole 14 in a state in which the temperature sensor 13 is penetrated and coupled through the temperature sensor hole 14. The material of the sealing material is not particularly limited. For example, the sealing material may be silicon rubber. Gas leakage to the outside is prevented through the temperature sensor hole 14 through the application of sealing material, and by preventing the drop of the pressure due thereto, precise pressure measurement becomes possible.

In addition, according to another embodiment of the present invention, a display unit for displaying the temperature value measured from the temperature sensor 13 may be further included. The display means for implementing such a display unit can be controlled through a control device such as a computer, and can be confirmed through a display connected thereto. That is, the temperature sensor 13 can monitor the surface temperature of the cylindrical battery cell from the outside in real time.

In a conventional battery cell, the internal pressure measuring unit was not included, and it was common to measure only the internal pressure value according to gas ejection. Herein, since the internal pressure of a battery cell measured according to a conventional method has a large error due to a change in temperature, a work for correcting the error was required separately. However, since the jig 1 for measuring internal pressure according to the present invention is provided with a temperature measuring unit 12, not only it is possible to perform temperature measurement and monitoring of the battery cell from the outside, but also it is possible to perform pressure correction according to accurate temperature measurement, thereby exhibiting the effect of allowing precise internal pressure measurement.

Figure 4:
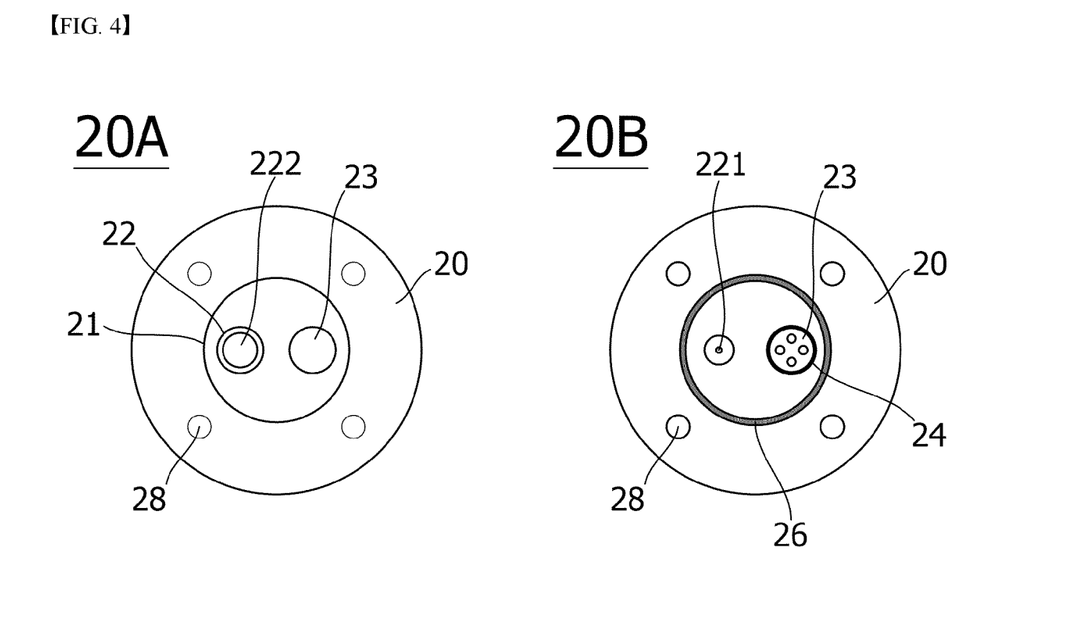
FIG. 4 is a top/bottom sectional view of an upper jig of the present invention.
Figure 5:
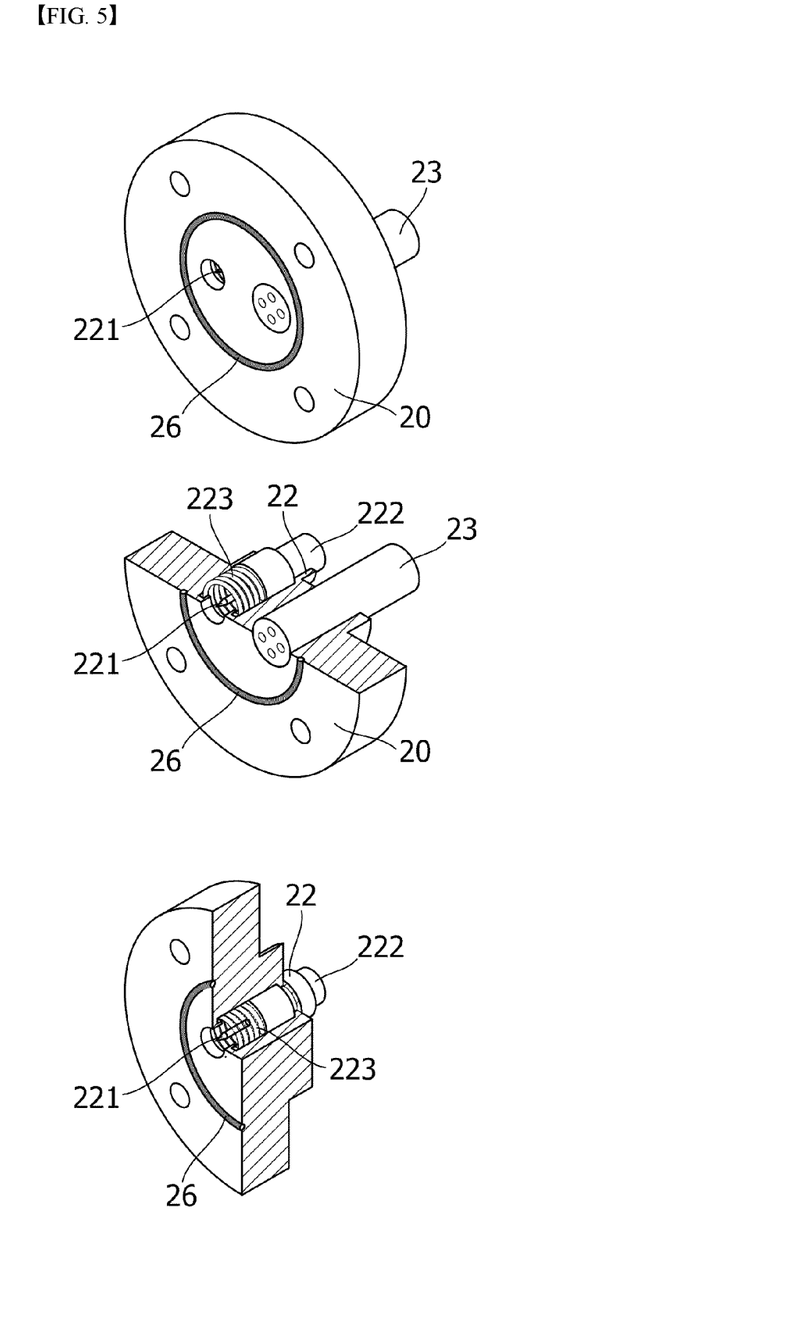
FIG. 5 is a three-dimensional view showing one surface of the upper jig of the present invention.

FIG. 4 is a schematic view showing the upper jig 20 of a jig for measuring internal pressure, in which 20A is a plan view of the upper jig 20 facing the lower jig 10, and 20B is a plan view of the upper jig 10 exposed in the outer direction. FIG. 5 is a three-dimensional view showing one surface of the upper jig 20.

First, referring to 20A of FIG. 4, the upper jig 20 is provided with a pressure measuring unit 21, and the pressure measuring unit 21 includes a gas discharge induction unit 22 for forming a hole in the cylindrical battery cell, and a pressure sensor 23 for measuring the pressure of the gas discharged by the operation of the gas discharge induction unit 22 so that the gas inside the cylindrical battery cell can be discharged.

Referring to FIG. 5, first, the gas discharge induction unit 22 has a structure penetrating the upper jig 20. Specifically, the gas discharge induction unit 22 includes a gas discharge operation switch 222 exposed toward the outside direction, has one side of a sharp shape, and includes a support unit 223 which forms a hole in the loaded cylindrical battery cell.

First, the gas discharge operation switch 222 is exposed to the outside of the jig and is a physical switch for forming a hole on one surface of the loaded cylindrical battery cell when the user measures the internal pressure. That is, when the user pushes the gas discharge operation switch 222, the support unit 223 positioned toward the inside of the jig moves in the loaded cylindrical battery cell direction. As such, the support unit 223 allows gas to penetrate the lower surface of the battery cell to thereby be discharged from the inside of the battery cell into the jig. Conversely, when the gas discharge operation switch 222 is pulled, the internal support unit 223 returns to its original position.

In the present invention, as shown in FIG. 5, the gas discharge operation switch 222 is characterized in that it includes a spring 223 therein for the push/pull operation. By including the spring 223 therein, when the user pushes the gas discharge operation switch 222 once, a hole is formed in the battery cell through the internal support unit 223, and then when pushed once again, the support unit 223 is returned to the original position by the spring 223.

The support unit 223 is for forming a hole in a cylindrical battery cell, but is preferably in the shape of a needle or cone, but is not limited thereto. An object having a sharp shape for forming a hole on one surface of the cylindrical battery cell can be used as the support unit 223 of the present invention.

In addition, the pressure measuring unit 21 of the present invention includes a pressure sensor 23 for measuring the pressure of the gas discharged by the operation of the gas discharge induction unit 22.

First, the pressure sensor 23 has a structure penetrating the upper jig 20. To this end, referring to FIG. 4, a pressure sensor hole 24 is formed.

The pressure sensor hole 24 provides an installation space of the pressure sensor 23. The pressure sensor hole 24 is formed along the periphery of the pressure sensor 23 on one surface of the upper jig 20 when the pressure sensor 23 is combined with the upper jig 20, as shown in FIGS. 4 and 5.

In the present invention, a sealing material is applied and sealed along the outer circumference of the pressure sensor hole 24. That is, the pressure sensor hole 24 is sealed through the sealing material in a state that the pressure sensor 23 penetrates the upper jig 20. This is to completely seal a space between the pressure sensor 23 and the pressure sensor hole 24. The material of the sealing material is not particularly limited, and may be, for example, silicone rubber.

Meanwhile, the upper jig 20 of the present invention may further include a sealing member 26 corresponding to the circumference of the receiving groove 11 of the lower jig 10 when engaged with the lower jig 10. Specifically, referring to 20B of FIG. 4, it can be seen that the sealing member 26 is formed on one surface of the upper jig 20 facing the lower jig 10.

The sealing member 26 is a member for sealing a space between the receiving groove 11 and the upper jig 20. As shown in FIG. 4, the sealing member 26 is formed on one surface of the upper jig 20 and is formed to correspond to the receiving groove 11 of the lower jig 10. The installation method of a sealing member 26 is not specifically limited. In the present invention, preferably, a sealing groove (not shown) formed along the circumference of the receiving groove 11 may be further provided to install the sealing member 26.

The sealing member 26 may be formed by applying a sealing material to the sealing groove so that the upper jig 20 is in contact with the lower jig 10 by pressure when the opening of the receiving groove 11 is closed. That is, it is to completely seal a space between the receiving groove 11 and the upper jig 20. The material of the sealing material is not particularly limited, and may be, for example, silicone rubber.

Figure 6:
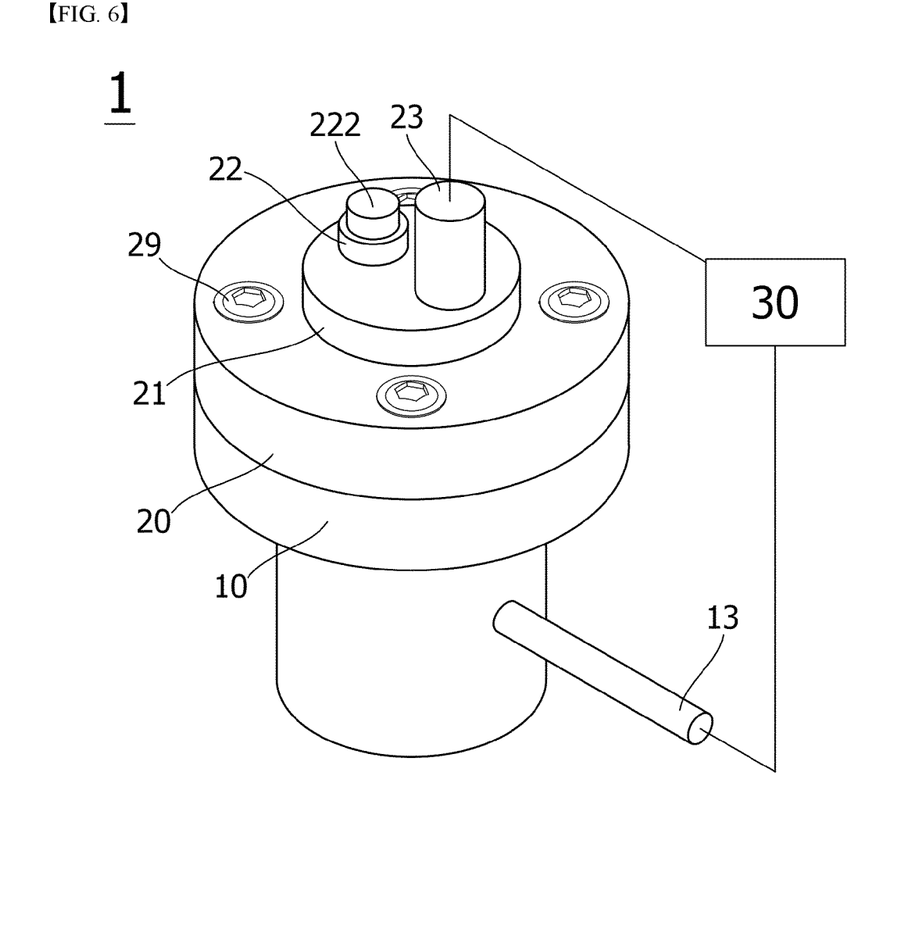
FIG. 6 is a schematic diagram showing connection between a jig for measuring internal pressure and a display unit of the present invention.

According to another embodiment of the present invention, the jig for measuring internal pressure 1 further includes a temperature measuring unit 12 and a display unit 30 for displaying the temperature and pressure measured by the pressure measuring unit 21, respectively. As shown in FIG. 6, the temperature measuring unit 12 and the pressure measuring unit 21 are connected to the display unit 30. The display unit 30 may synthesize the temperature data and pressure data received from the temperature measuring unit 12 and the pressure measuring unit 21 to thereby generate data of temperature and pressure in which the internal gas is generated, and output the collected data as images. The display unit 30 can also display the quantitative and qualitative analysis data of the internal gas and the corrected data of the pressure value according to the temperature value. To this end, the display unit 30 may further include a control unit and a display.

Hereinafter, a cylindrical battery cell usable in the present invention will be described.

Figure 7:
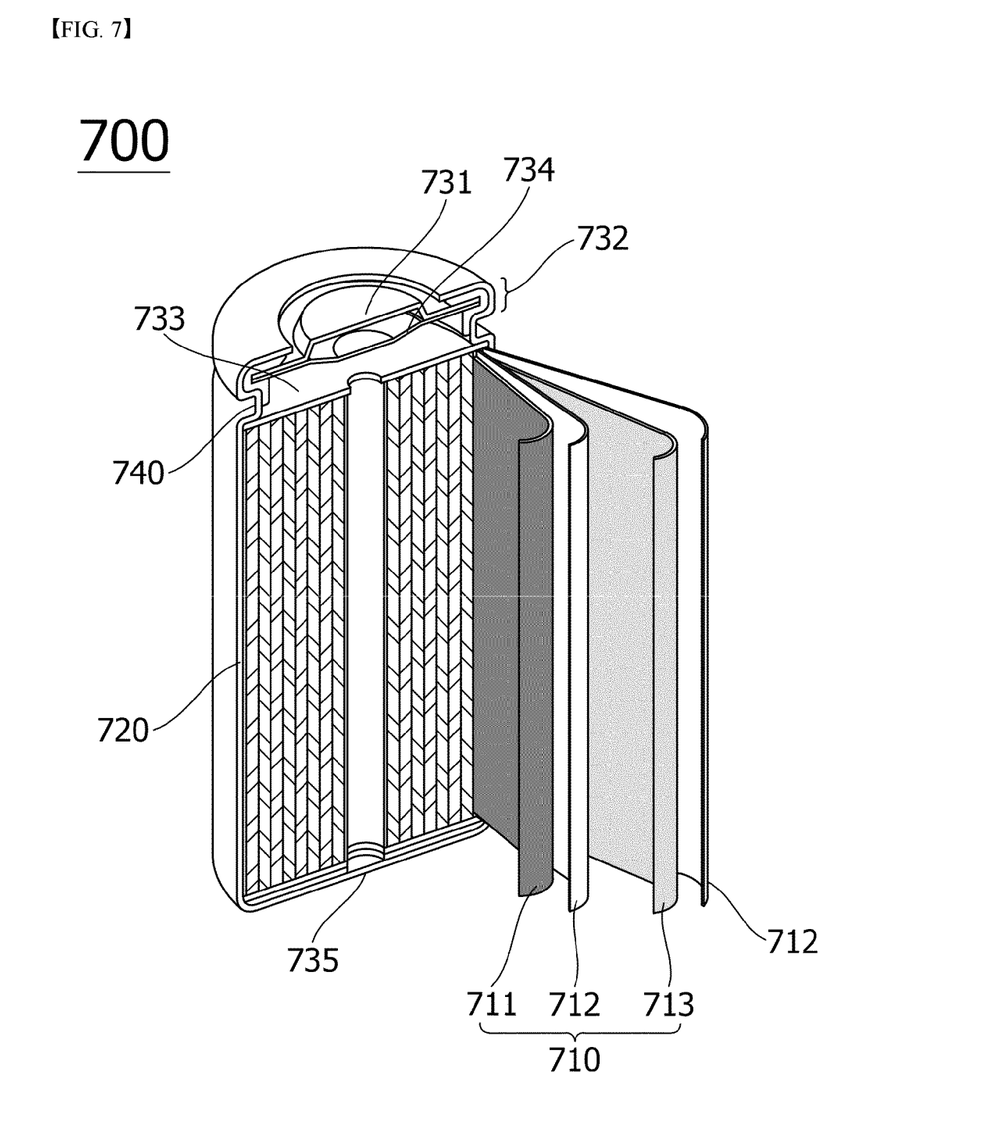
FIG. 7 is a cross-sectional view showing a cylindrical battery cell loaded in a jig for measuring internal pressure of the present invention.

Referring to FIG. 7, in the cylindrical battery cell 700, a jelly-roll type (wound) electrode assembly 710 is accommodated in a receiving portion of the cylindrical can 720, the electrolyte is injected into the receiving portion so that the electrode assembly 710 is completely immersed in the cylindrical can 720, and a cap assembly 732 is mounted and coupled to an open top end of the cylindrical can 720.

The electrode assembly 710 has a structure in which a positive electrode 713, a separator 712, and a negative electrode 711 are sequentially stacked and wound in a round shape, and a cylindrical center pin (not shown) may be inserted into the center of the electrode assembly 710. The center pin is generally made of a metal material to impart a predetermined strength, and has a hollow cylindrical structure in which a plate is rounded. In some cases, the center pin may be removed after welding the electrode of the electrode assembly 710 to the cylindrical can 720 or the cap assembly 732.

The cap assembly 732 has a structure in which the upper cap 731 and the internal pressure drop safety vent are in close contact with each other at the inside of the airtight gasket mounted on the upper inner surface of the crimping part and the beading part 740 of the cylindrical can 720, the upper cap 731 protrudes upward and serves as a positive electrode, and a plurality of through-holes through which the gas inside the can may be discharged may be formed along the periphery of the protrusion. In addition, a positive electrode tab protrudes from the insulating plate in the upper axial direction at the center of the electrode assembly 710 to be electrically connected to the upper cap 731 of the cap assembly 732 to apply an electric current. Further, a safety vent 734 is a thin film structure through which a current flows, and a central portion thereof is recessed to form an indented central portion, and two notches reaching depths are formed at the upper and lower bending portions of the central portion.

An insulating plate 733 is mounted on the upper surface of the electrode assembly 710 to prevent contact with the electrode lead, thereby preventing a short circuit due to contact between the electrode assembly 710 and the electrode lead.

The cylindrical can 720 may be made of metal, preferably made of stainless steel. In addition, the cylindrical can 720 may include a receiving unit in which the electrode assembly 710 may be accommodated, and the upper end part may be open.

On the other hand, the positive electrode tab of the electrode assembly 710 is protruded in the upper axial direction from the insulating plate 733 to be coupled to the upper cap of the cap assembly by spot welding and may be electrically connected to make the electricity. In addition, the negative electrode tab of the electrode assembly may be spot welded to the lower inner surface of the cylindrical can and electrically connected to apply electric current.

Meanwhile, the cylindrical battery cell used in the present invention includes two or more unit electrodes including a positive electrode or a negative electrode, and an electrode assembly, which is wound in a state where a separator is interposed between the unit electrodes, is embedded in the battery case. In the present invention, the unit electrode may be manufactured by applying an electrode mixture containing an electrode active material on a current collector and then drying the electrode mixture. The electrode mixture may further include a binder, a conductive material, a filler, and the like, as necessary.

Both weak magnetic and nonmagnetic metal ultrathins may be used as the current collector. The positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, or aluminum or stainless steel of which the surface has been treated with carbon, nickel, titanium, silver, or the like. The current collector may have fine irregularities on the surface thereof to increase the adhesion of the positive electrode active material, and various forms such as a sheet, a foil, and a net are possible.

The negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a sheet, a foil, and a net.

The positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or CO; olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, groups 1, 2, and 3 of the periodic table, halogen; $0 < x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and thermal black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The lithium salt-containing non-aqueous electrolyte solution consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

The above-described jig for measuring internal pressure according to an embodiment of the present invention exhibits effects capable of accurately measuring the internal pressure of the cylindrical battery cell of the secondary battery.

In addition, according to the jig for measuring internal pressure of the present invention, when a cylindrical battery cell is loaded and gas is ejected from the battery cell after the upper and lower jigs are fastened, it is possible to minimize the accommodation space, thereby exhibiting the effect of more accurately performing internal pressure measurement.

In addition, according to the jig for measuring internal pressure of the present invention, when measuring the internal pressure by loading the upper jig and the lower jig, the cell gas generating unit and the cell internal pressure measuring unit are placed in the same space, thereby exhibiting the effect of reducing the errors of internal pressure measurement.

In addition, the jig for measuring internal pressure of the present invention includes a temperature measuring unit capable of measuring and monitoring from the outside of the jig, so it is possible to detect and check the temperature change in real-time when measuring the inner pressure, thereby minimizing the occurrence of errors during pressure correction.

While the present invention has been particularly shown and described with reference to exemplary embodiments thereof, it is to be understood that the present invention is not limited to the disclosed exemplary embodiments, and various changes and modifications may be made without departing from the technical idea of the present invention and the scope of the appended claims.

[Description of reference numerals]

1: jig for measuring internal pressure
10: lower jig
11: receiving groove
12: temperature measuring unit
13: temperature sensor
14: temperature sensor hole
18: lower coupling hole
20: upper jig
21: pressure measuring unit
22: gas discharge induction unit
23: pressure sensor
24: pressure sensor hole
26: sealing member
28: upper coupling hole
29: coupling member
30: display unit
221: support unit
222: gas discharge operation switch
223: spring
700: battery cell
710: electrode assembly
711: negative electrode
712: separator
713: positive electrode
720: cylindrical can
731: upper cap
732: cap assembly
733: insulating plate
734: safety vent
735: cylindrical battery cell floor
740: crimping part and beading part

The invention claimed is:

1. A jig for measuring internal pressure of a cylindrical battery cell, the jig comprising:
a lower jig having a shape corresponding to a shape of the cylindrical battery cell, and including a receiving groove, into which the cylindrical battery cell is detachably fitted, and a temperature measuring unit; and
an upper jig including a pressure measuring unit and being detachably coupled with the lower jig to close an opening of the receiving groove,
wherein the pressure measuring unit includes:
a gas discharge induction unit configured to make a hole in the cylindrical battery cell to discharge gas from inside the cylindrical battery cell; and
pressure sensor configured to measure a pressure of the gas discharged by operation of the gas discharge induction unit.

2. The jig of claim 1, wherein the temperature measuring unit includes a temperature sensor extending into the receiving groove to measure the temperature of the cylindrical battery cell,
wherein the lower jig further includes a temperature sensor hole through which the temperature sensor is inserted.

3. The jig of claim 2, wherein the temperature sensor hole is sealed with a sealing material in a space surrounding the temperature sensor, which is penetrated into the temperature sensor hole.

4. The jig of claim 2, wherein the temperature sensor is a thermocouple in which steel use stainless (SUS) wire is covered with an insulating member.

5. The jig of claim 1, wherein the upper jig further includes a pressure sensor hole through which the pressure sensor is inserted.

6. The jig of claim 5, wherein the pressure sensor hole is sealed with a sealing material in a space surrounding the pressure sensor, which is penetrated into the pressure sensor hole.

7. The jig of claim 1, wherein the gas discharge induction unit includes a support unit having a sharp shape on one surface and forming a hole in the cylindrical battery cell, and a gas discharge operation switch connected to the support unit, which moves the support unit in a direction of the cylindrical battery cell.

8. The jig of claim 7, wherein the support unit has a needle or a cone shape.

9. The jig of claim 7, wherein the gas discharge operation switch includes a spring supporting a push and/or pull scheme.

10. The jig of claim 1, wherein the upper jig includes a sealing member, which seals a space between the receiving groove and the upper jig.

11. The jig of claim 10, wherein the upper jig further includes a sealing groove formed along a circumference of the receiving groove, and
wherein the sealing member is formed by applying a sealing material on the sealing groove to be in pressure contact with the lower jig when the upper jig closes an opening of the receiving groove.

12. The jig of claim 1, further comprising a coupling member configured to closely couple the upper jig to the lower jig.

13. The jig of claim 12, wherein the lower jig further includes at least one lower coupling hole,
wherein the upper jig further includes at least one upper coupling hole corresponding to the lower coupling hole, and
wherein the coupling member comprises a coupling bolt screwed to the lower coupling hole and the upper coupling hole.

14. The jig of claim 1, further comprising a display unit for displaying a temperature and a pressure measured by the temperature measuring unit and the pressure measuring unit, respectively.

* * * * *